United States Patent
Moens et al.

(10) Patent No.: US 7,816,420 B2
(45) Date of Patent: *Oct. 19, 2010

(54) RADIATION CURABLE LOW GLOSS POWDER COATING COMPOSITIONS

(75) Inventors: Luc Moens, St. Genesius-Rode (BE); Nele Knoops, Herent (BE); Daniel Maetens, Brussels (BE)

(73) Assignee: Cytec Surface Specialties, S.A., Bruxelles (BE)

( * ) Notice: Subject to any disclaimer, the term of this patent is extended or adjusted under 35 U.S.C. 154(b) by 703 days.

This patent is subject to a terminal disclaimer.

(21) Appl. No.: 11/587,534

(22) PCT Filed: Apr. 5, 2005

(86) PCT No.: PCT/EP2005/003563

§ 371 (c)(1),
(2), (4) Date: Nov. 15, 2006

(87) PCT Pub. No.: WO2005/108513

PCT Pub. Date: Nov. 17, 2005

(65) Prior Publication Data

US 2008/0011196 A1    Jan. 17, 2008

(30) Foreign Application Priority Data

May 7, 2004    (EP) .................... 04011010

(51) Int. Cl.
*C09D 167/07* (2006.01)
*C09D 133/02* (2006.01)
*C08L 67/07* (2006.01)

(52) U.S. Cl. .................. 522/104; 522/101; 522/109; 522/129

(58) Field of Classification Search ............... 522/104, 522/101, 109, 129

See application file for complete search history.

(56) References Cited

U.S. PATENT DOCUMENTS

| 3,974,303 | A | 8/1976 | Iwase et al. |
| 6,017,593 | A | 1/2000 | Daly et al. |
| 6,348,242 | B1 | 2/2002 | Daly et al. |
| 6,380,279 | B1 * | 4/2002 | Moens et al. ............... 522/111 |
| 6,384,102 | B1 | 5/2002 | Moens et al. |
| 6,852,765 | B2 * | 2/2005 | Decker et al. ................ 522/2 |
| 2002/0183416 | A1 | 12/2002 | Daly et al. |
| 2007/0225396 | A1 * | 9/2007 | Moens et al. ............... 522/104 |

FOREIGN PATENT DOCUMENTS

| WO | 93/25596 | 12/1993 |
| WO | 97/27253 | 7/1997 |
| WO | 98/18874 | 5/1998 |
| WO | 98/55554 | 12/1998 |
| WO | 02/100957 | 12/2002 |
| WO | WO 02100957 A1 * | 12/2002 |
| WO | WO 03010254 A2 * | 2/2003 |

* cited by examiner

*Primary Examiner*—Satya B Sastri
(74) *Attorney, Agent, or Firm*—Wenderoth, Lind & Ponack L.L.P.

(57) ABSTRACT

A radiation curable powder coating composition for preparing low gloss coatings, comprises as a binder a mixture of 30 to 90 weight % of one or more (meth)acryloyl group containing amorphous polyester resins having an unsaturated equivalent weight of more than 700 g/double bond and an isophthalic acid content of from 65 to 100 weight %, calculated on all the acids, and 10 to 70 weight % of one or more (meth) acryloyl group containing acrylic copolymers having an unsaturated equivalent weight of up to 1250 g/double bond.

16 Claims, No Drawings

RADIATION CURABLE LOW GLOSS POWDER COATING COMPOSITIONS

The invention concerns powder compositions, hardenable by radiation and usable as low gloss paint or varnish.

Powder coatings, which are dry, finely divided, free flowing, solid materials at room temperature, have gained considerable popularity in recent years over liquid coatings for a number of reasons. For one, powder coatings are user and environmentally friendly materials, since they are virtually free of harmful fugitive organic solvent carriers that are normally present in liquid coatings. Powder coatings, therefore, give off little, if any, volatile materials to the environment when cured. This eliminates the solvent emission problems associated with liquid coatings, such as air pollution and dangers to the health of workers employed in coating operations.

Powder coatings are also clean and convenient to use. They are applied in a clean manner over the substrate, since they are in dry, solid form. The powders are easily swept up in the event of a spill and do not require special cleaning and spill containment supplies, as do liquid coatings. Working hygiene is, thus, improved. No messy liquids are used that adhere to worker's clothes and to the coating equipment, which leads to increased machine downtime and clean up costs.

Powder coatings are essentially 100% recyclable. Over sprayed powders can be fully reclaimed and recombined with the powder feed. This provides very high coating efficiencies and also substantially reduces the amount of waste generated. Recycling of liquid coatings during application is not done, which leads to increased waste and hazardous waste disposal costs.

Powder paints are applied to a substrate as a powder using an electrostatic or friction-charging spraygun, the fluidised bed technique or others and are adapted to flow out on the substrate upon heat curing of the powder.

Powder paints can be thermosetting or thermoplastic clear or pigmented paint coatings and ordinarily are factory applied coatings and cured under heat.

Despite their many advantages, nowadays thermosetting powder coatings generally are cured at temperatures of at least 150° C. Below this recommended temperature the coatings have poor appearance as well as poor physical and chemical properties. In consequence of this restriction, powder coatings are generally not employed in coating heat-sensitive substrates such as wood and plastic or assembled metallic parts containing heat-sensitive components. Heat-sensitive substrates or components both demand low curing temperatures, preferably below 140° C., to avoid significant degradation and/or deformation.

Powders curable at low temperature by ultraviolet light (UV) or electron beam (EB) have recently been proposed as a solution to this problem.

UV or EB powders still require exposure to heat, which is above either the glass transition temperature ($T_g$) or melt temperature ($T_m$) to sufficiently melt and flow out the powders in a continuous, smooth, molten film over the substrate prior to radiation curing. However, the heat load on the substrate is significantly reduced, since UV or EB powders are formulated to melt and flow out at much lower temperatures than traditional powder coatings, typically on the order of about 90-140° C. Therefore, UV or EB powders only need to be exposed to enough low temperature heat required to flow out the powders into a smooth molten film.

Curing or hardening of UV powders is accomplished by exposing the molten film to light from a UV source, such as a mercury UV lamp, which rapidly cures the film. Since the cross linking reactions are triggered with UV radiation rather than heat, this procedure allows the powder coatings to be cured more quickly and at much lower temperatures than traditional heat curable powders.

Another significant advantage of UV or EB curable powders is that the heated flow out step is divorced from the cure step. This enables the UV or EB powders to completely outgas substrate volatiles during flow out and produce smooth films prior to the initiation of any curing reactions.

The use of unsaturated resins, eventually in combination with unsaturated oligomers, as a binder for radiation curable powder coatings already is subject of a number of patents and patent applications.

Coating performances such as storage stability, flow, flexibility, hardness, resistance to yellowing and solvent resistance (methyl ethyl ketone resistance) obtained after melting at temperatures below 150° C., followed by UV or EB irradiation, are generally claimed.

UV or EB curable powder coatings compositions derived from ethylenically unsaturated group containing polyesters, polyacrylic copolymers, polyesterurethanes or epoxy resins, among others, already have been extensively illustrated.

At the present time the majority of these radiation curable powder coating compositions provide coatings having a high gloss after fusion and curing which is in fact very often equal to or even greater than 90%, at an angle of 60°.

There is an increasing demand for radiation curable powdered paints and varnishes which provide matt coatings of good quality, intended for use in for example the furniture industry.

Various methods for manufacturing powdered paints and varnishes that provide matt coatings after melting and irradiation, already have been proposed.

WO 98/55554 claims for powder paint compositions which are matt or satin and hardenable by means of radiation or radical catalysts, comprising unsaturated polymers as a binder characterised in that said compositions consist of physical blends, but not intimately homogenised, obtained by mixing, in the molten or hot or cold state, two or more powder paints each one comprising an unsaturated polymer different for "amorphous or crystalline" appearance and for amount of unsaturated functional groups. Maximal opacity is obtained with a 1:1 ratio by weight of the two mixtures.

U.S. Pat. No. 6,348,242 claims for a method for producing low gloss UV curable powder coatings comprising crystalline components or blends of crystalline and amorphous components. After heat fusing the powders together, the crystalline components in the coating are allowed to recrystallise during at least 5 minutes at a temperature of about the melting temperature of the crystalline components before curing with UV-irradiation. In U.S. Pat. No. 6,017,593 the recrystallisation of the semi-crystalline component is obtained by cooling down the heat fused coating before curing with UV-light.

WO 97/27253 claims for radiation curable powder paint binder compositions comprising a polymer having unsaturated groups and optionally a crosslinker, characterised in that more than 0.5 mole percentage of the total amount of polymerisable ethylenic unsaturation of the binder composition results from itaconic acid esters.

WO 02/100957 is directed to a powder coating composition that produces a low gloss coating upon cure. By adding spheroidal particles to the powder coating composition, further reduction in gloss can be obtained while improving smoothness. The crosslinkable acrylic copolymer of WO 02/100957 is characterised by a concentration of crosslinkable groups ranging from about 0.3 percent to about 10 percent of the weight of the crosslinkable acrylic copolymer.

Some of the suitable crosslinkable groups include acrylate, methacrylate, maleate, fumarate, itaconate and a combination thereof. Yet, as it appear from the examples, a good chemical resistance is not obtained in the methylethylketone (MEK) double rub test. The best value obtained is of 4.5 in a scale of from 1 to 5, after 50 double rubs with a swab impregnated with MEK.

Despite the nowadays existing variability of methods for getting matt finishes, experience however has shown that they all are subject to one or more disadvantages, attributed to problems of formulation (dependence of pigmentation, additives), problems of processing (dependence of extruder type, extrusion temperature, . . . ), problems of application (dependence of curing time and temperature), as well as to overall coating performances particularly relative to the gloss value as such as to the reproducibility and reliability of the gloss value.

There is thus still a need for powdered radiation curable compositions, preferably prepared by a single extrusion process, and capable of producing matt coatings which do not exhibit the defects and/or drawbacks and/or limitations of prior art.

We now have surprisingly found radiation curable powder coating compositions for preparing low gloss coatings, comprising as a binder a mixture of 30 to 90 weight % of one or more (meth)acryloyl group containing amorphous polyester resins having an unsaturated equivalent weight of more than 700 g/double bond and an isophthalic acid content of 65 to 100 mol %, calculated on all the acids, and 10 to 70 weight % of one or more (meth)acryloyl group containing acrylic copolymers having an unsaturated equivalent weight of up to 1250 g/double bond.

Upon application, melting and curing by irradiation, these powder coating compositions allow for smooth matt finishes proving adjustable and reproducible relative 60° gloss values ranging from 10 to 80%. These coatings also prove a very good chemical resistance in the MEK double rub test.

By the terms "low gloss", "semi-gloss", "matt" and "semi-matt" in this specification, it is intended relative gloss values of from 10 to 80%, measured according to ASTM D523.

In this specification, the term "isophthalic acid rich polyester" indicates a polyester containing from 65 to 100 mol % of isophthalic acid, calculated on all the acids constituting the polyester.

The invention also concerns the process for the preparation of the resin mixture, constituting the binder of the powder coating composition of the present invention.

According to the present invention the resin mixture constituting the binder of the powder coating composition is preferably obtained from reaction in bulk of a monomer, having a (meth)acryloyl group and an epoxy functional group reactive with the carboxylic acid groups of an intimate mixture comprising one or more carboxylic acid group containing polyester(s) and one or more carboxylic acid group containing acrylic copolymer(s). According to the present invention, the monomer, having a (meth)acryloyl group and an epoxy functional group is preferably selected from glycidyl acrylate, glycidyl methacrylate, methyl glycidyl methacrylate, methyl glycidyl acrylate, 3,4-epoxycyclohexylmethyl(meth)acrylate, 1,2-ethyleneglycolglycidylether(meth)acrylate, 1,3-propyleneglycolglycidylether(meth)acrylate, 1,4-butylene-glycolether(meth)acrylate, 1,6-hexanediolether(meth)acrylate, 1,3-(2-ethyl-2-butyl)-propanediolglycidylether(meth)acrylate, acrylic glycidyl ether and their mixtures.

The composition accordingly the present invention allows for finishes proving outstanding smoothness, hardness and solvent resistance.

Besides it has been found that dry blending the radiation curable powder coating composition of the present invention with one or more other powder coating compositions comprising one or more unsaturated resins, it is possible to further modify and adjust the 60° relative gloss value.

The present invention preferably provides a method for preparing the binder of a powder composition, wherein a monomer having a (meth)acryloyl group and an epoxy functional group, preferably glycidyl(meth)acrylate, is reacted with the carboxylic acid groups of a mixture of resins comprising:

a) 30 to 90 weight percentage of one or more carboxyl group containing amorphous isophthalic acid rich polyesters;

b) 10 to 70 weight percentage of one or more carboxyl group containing acrylic copolymers.

Other synthetical methods well known in the art can also be used. For example, one can use the direct esterification of a carboxyl group containing polyester and acrylic copolymer, alone or separately, with an hydroxy(meth)acrylate, or the direct esterification of an hydroxyl group containing polyester and acrylic copolymer, alone or separately, with (meth) acrylic acid.

Said compositions are useful for preparing powder paints and varnishes providing excellent quality coatings with reduced gloss adjustable from 10 to 80%, as measured at a geometry of 60° according to the ASTM D523 standard.

The acid functionalised amorphous polyester of the present invention can be obtained from direct esterification of an excess of one or more polyacids with one or more polyols, or from carboxylation and chain extension with a polyacid of a hydroxyl functionalised polyester.

The polyester is preferably the reaction product of 1. an acid constituent which contains from 65 to 100 mole percentage of isophthalic acid and from 0 to 35 mole percentage of at least one other saturated or unsaturated aliphatic, cycloaliphatic or aromatic di- or polycarboxylic acid such as phthalic acid, 1,4-cyclohexanedicarboxylic acid, 1,3-cyclohexane-dicarboxylic acid, 1,2-cyclohexanedicarboxylic acid, succinic acid, adipic aid, glutaric acid, pimelic acid, suberic acid, azealic acid, sebacic acid, 1,12-dode-canedioic acid, itaconic acid, citraconic acid, fumaric acid, maleic acid, trimellitic acid, pyromellitic acid, etc., or the corresponding anhydrides, and 2. an alcohol constituent which contains from 20 to 100 mole percentage of neopentyl glycol, and from 0 to 80 mole percentage of at least one other aliphatic or cycloaliphatic polyol such as ethylene glycol, propylene glycol, diethylene glycol, 1,4-butanediol, 1,6-hexanediol, 1,4-cyclohexanediol, 1,4-cyclohexanedimethanol, 2-methyl-1,3-propanediol, hydrogenated Bisphenol A, hydroxypivalate of neopentyl glycol, trimethylolpropane, ditrimethylolpropane, pentaerythrytol, etc.

The carboxyl functionalised amorphous isophthalic acid rich polyester is preferably further characterised by an acid number ranging from 10 to 90 mg KOH/g, and more preferably from 20 to 70 mg KOH/g and a number average molecular weight from 1200 to 15000, and more preferably from 1500 to 8500, measured by gel permeation chromatography (GPC). Its Brookfield cone/plate viscosity at 200° C. is preferably from 10 to 50000 mPa·s, according to ASTM D4287-88, and its glass transition temperature of from 35 to 85° C., as measured by differential scanning calorimetry (DSC) according to ASTM D3418-82.

For the preparation of the amorphous polyesters containing carboxyl groups, use is generally made of a conventional reactor equipped with a stirrer, an inert gas (nitrogen) inlet, a distillation column connected to a water-cooled condenser and a thermometer connected to a thermoregulator.

The esterification conditions used for the preparation of these polyesters are conventional, namely that it is possible to use an ordinary esterification catalyst derived from tin, such as dibutyltin oxide, dibutyltin dilaurate or n-dibutyltin trioctoate, or derived from titanium, such as tetrabutyl titanate, in the proportion of 0 to 1% by weight of the reactants, and optionally to add antioxidants, such as the phenol compounds Irganox 1010 (Ciba) or Ionol CP (Shell) or stabilisers of phosphonite or phosphite type, such as tributyl phosphite or triphenyl phosphite, in the proportion of 0 to 1% by weight of the reactants.

The polyesterification is generally carried out at a temperature which is gradually increased from 130 to approximately 180 to 250° C., first at normal pressure and then under reduced pressure at the end of each step of the process, these conditions being maintained until a polyester is obtained which exhibits the desired hydroxyl and/or acid number. The degree of esterification is monitored by determination of the amount of water formed during the reaction and of the properties of the polyester obtained, for example the hydroxyl number, the acid number, the molecular weight and/or the viscosity.

The carboxylic acid group containing monomer used for the preparation of the acrylic copolymer of the present invention is preferably used in mole percentages ranging from 10 to 95 and is selected from, for example, acrylic acid, methacrylic acid, crotonic acid, itaconic acid, fumaric acid, maleic acid, citraconic acid, the monoalkylesters of unsaturated dicarboxylic acids. They can be used by themselves or in combination of two or more.

The other monomers copolymerisable with the carboxylic acid group containing monomer are generally used in mole percentages ranging from 5 to 90 and are preferably selected from methyl(meth)acrylate, ethyl(meth)acrylate, propyl (meth)acrylate, n-butyl(meth)acrylate, isobutyl(meth)acrylate, tert.butyl(meth)acrylate, 2-ethylhexyl(meth)acrylate, stearyl(meth)acrylate, tridecyl(meth)acrylate, cyclohexyl (meth)acrylate, n-hexyl(meth)acrylate, benzyl(meth)acrylate, phenyl(meth)acrylate, isobornyl(meth)acrylate, nonyl (meth)acrylate, hydroxyethyl(meth)acrylate, hydroxypropyl (meth)acrylate, hydroxybutyl(meth)acrylate, 1,4-butandiol mono(meth)acrylate, the esters of methacrylic acid, dimethylaminoethyl(meth)acrylate, diethylaminoethyl(meth)acrylate, styrene, α-methylstyrene, vinyltoluene, (meth)acrylonitrile, vinylacetate, vinylpropionate, acrylamide, methacrylamide, methylol(meth)acrylamide, vinylchloride, ethylene, propylene, C4-20 olefins and α-olefins. They can be used by themselves or in combination of two or more.

The carboxylic acid group containing acrylic copolymers of the present invention preferably have an acid number of from 75 to 300 mg KOH/g and more preferably of from 75 to 200 mg KOH/g, a number average molecular weight from 1000 to 60000, and more preferably from 2000 to 15000, a Brookfield cone/plate viscosity at 200° C. from 10 to 50000 mPa·s, and a glass transition temperature, measured by differential scanning calorimeter of from 45 to 120° C. These parameters are determined according to the same standards as the parameters of the carboxylic acid group containing amorphous polyester.

According to the present invention, the carboxylic acid group containing acrylic copolymer can be composed of a blend of a high glass transition, low number average molecular weight and a low glass transition, high number average molecular weight acrylic copolymer.

The carboxylic acid group containing acrylic copolymer is usually prepared by conventional polymerisation techniques, either in mass, in emulsion, or in the solution of an organic solvent. The nature of the solvent is very little of importance, provided that it is inert and that it readily dissolves the monomers and the synthesised copolymer. Suitable solvents include toluene, ethyl acetate, butyl acetate, xylene, etc. The monomers are copolymerised in the presence of a free radical polymerisation initiator (benzoyl peroxide, dibutyl peroxide, azo-bis-isobutyronitrile, and the like) in an amount representing 0.1 to 4.0% by weight of the monomers.

To achieve a good control of the molecular weight and its distribution, a chain transfer agent, preferably of the mercaptan type, such as n-dodecylmercaptan, t-dodecanethiol, iso-octylmercaptan, or of the carbon halide type, such as carbon tetrabromide, bromo-trichloromethane, etc., can also be added in the course of the reaction. The chain transfer agent is generally used in amounts of up to 10% by weight of the monomers used in the copolymerisation.

A cylindrical, double walled reactor equipped with a stirrer, a condenser, an inert gas (nitrogen, for example) inlet and outlet, and metering pump feeding systems is generally used to prepare the carboxylic acid group containing acrylic copolymer. Polymerisation is carried out under conventional conditions. Thus, when polymerisation is carried out in solution, for example, an organic solvent is first introduced into the reactor and heated to the refluxing temperature under an inert gas atmosphere (nitrogen, carbon dioxide, and the like) and a homogeneous mixture of the required monomers, the free radical polymerisation initiator and the chain transfer agent, when needed, is then added to the solvent gradually over several hours. The reaction mixture is then maintained at the indicated temperature for certain hours, while stirring. The solvent is then removed from the copolymer obtained in vacuo.

The mixture of one or more amorphous isophthalic acid rich polyesters containing (meth)acryloyl groups and one or more acrylic copolymers containing (meth)acryloyl groups is preferably prepared in the following way:

On completion of the polycondensation, the carboxyl functional group containing amorphous isophthalic acid rich polyester(s) in the molten state, which is (are) found in the reactor described above, is (are) allowed to cool to a temperature between 100 and 180° C. Subsequently a well defined amount of carboxylic acid group containing acrylic copolymer(s) and optionally a radical polymerisation inhibitor, such as phenothiazine or an inhibitor of the hydroquinone type, is added in a proportion of 0.01 to 1% with respect to the weight of the polyester and acrylic copolymer.

Then, a substantially equivalent amount of a epoxy group containing monomer having a (meth)acryloyl group, preferably glycidyl methacrylate, is added thereto. A catalyst for the acid/epoxy reaction can optionally be used. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride). These catalysts are preferably used in an amount of 0.05 to 1% with respect to the weight of the polyester.

The reaction mixture is preferably brought at a temperature of about 100 to 200° C. during a period of 1 to 8 hours.

The degree of progression of the reaction can be monitored by determination of the properties of the resin mixture obtained, for example the hydroxyl number, the acid number, the degree of unsaturation and/or the content of free glycidyl group containing unsaturated monomer.

According to a further embodiment of the invention, the radiation curable powder compositions additionally can comprise an ethylenically unsaturated oligomer and/or one or more (meth)acryloyl groups containing semi-crystalline polyesters.

As examples of these ethylenically unsaturated oligomers, mention will be made of the triacrylate and the trimethacrylate of tris(2-hydroxyethyl)isocyanurate, the epoxy acrylates and methacrylates which are formed by the reaction of an epoxy compound (for example, the diglycidyl ether of Bisphenol A) with acrylic or methacrylic acid, the urethane acrylates and methacrylates which are formed by the reaction of an organic di- or polyisocyanate with an hydroxyalkylacrylate or a hydroxyalkyl methacrylate and optionally a mono- and/or polyhydroxylated alcohol (for example, the reaction product of hydroxyethyl(meth)acrylate with toluenedi-isocyanate or isophoronedi-isocyanate), the acrylic acrylates or methacrylates, such as, for example, the reaction product of (meth)acrylic acid with an oligomer containing glycidyl groups obtained by copolymerisation of acrylic monomers, such as n-butyl methacrylate and methyl-methacrylate, phosphorous containing compounds selected from the group consisting of phosphoric acid and organic derivatives of phosphinic acid, phosphonic acid and phosphoric acid, said organic derivatives having at least one organic moiety characterised by the presence of at least one unit of olefinic unsaturation such as for example 2-(meth)acryloyloxyethylphosphate, bis(2-(meth)acryloyloxyethyl)phosphate and the like.

The semi-crystalline polyesters that can be added to the radiation curable powder composition of the present invention are usually obtained from the reaction of a di-isocyanate with an hydroxyalkyl(meth)acrylate and a hydroxyl group containing semi-crystalline polyester or from reaction of glycidyl(meth)acrylate or methyl glycidyl (meth)acrylate with a semi-crystalline polyester containing carboxyl groups accordingly a procedure as for the amorphous unsaturated polyesters as described above.

The semi-crystalline hydroxyl or carboxyl group containing polyesters are preferably the reaction product of an acid constituent which contains 75 to 100 mole percentage of terephthalic acid, 1,4-cyclohexanedicarboxylic acid or a saturated straight-chain aliphatic dicarboxylic acid having 4 to 14 carbon atoms and from 0 to 25 mole percentage of at least one other saturated or unsaturated aliphatic, cycloaliphatic or aromatic di- or polycarboxylic acid, and a glycol constituent which contains 75 to 100 mole percentage of 1,4-cyclohexanedimethanol, 1,4-cyclohexanediol or a saturated straight-chain aliphatic diol having 2 to 12 carbon atoms, and from 0 to 25 mole percentage of at least one other aliphatic or cycloaliphatic di- or polyol.

The semi-crystalline polyesters containing (meth)acryloyl groups optionally incorporated in the compositions in accordance with the present invention preferably exhibit an unsaturated equivalent weight of at least 700 g/double bond and further are preferably characterised by a number average molecular weight between 1000 and 21000, more preferably between 1300 and 9000, a well-defined melting point of approximately 60 to 150° C., as measured by differential scanning calorimetry (DSC) according to ASTM D3418-82, a glass transition temperature of less than 50° C. and a Brookfield cone/plate viscosity at 175° C. of less than 10000 mPas. The other parameters than the melting point are determined according to the same standards as the parameters of the carboxylic acid group containing amorphous polyester.

As these ethylenically unsaturated oligomers and semi-crystalline polyesters contain polymerisable double bounds, they also participate in the radiation curing and can consequently provide coatings with an improved flow and a surface hardness which is further increased. Depending on the envisaged applications, the compositions in accordance with the invention contain 0 to 60, preferably 0 to 30, more preferably 0 to 10 parts by weight of ethylenically unsaturated oligomer and/or from 0 to 60, preferably 0 to 30, more preferably 0 to 20 parts by weight of at least one semi-crystalline polyester per 100 parts of binder, comprising the (meth)acryloyl group containing polyester and acrylic copolymer mixture, in accordance with the invention.

The amorphous polyester and acrylic copolymer mixture containing (meth)acryloyl groups, optionally along with the ethylenically unsaturated oligomer and/or the semi-crystalline polyester containing (meth)acryloyl groups, all described above, are intended to be used as binders in the preparation of powder compositions (A) for matt or semi-gloss coatings.

The powder compositions of the present invention (A) can be used as such or in a dry blend with one or more other powder(s) (B) comprising as a binder one or more unsaturated resins, selected from:

- (meth)acryloyl group containing polyesters obtainable from the reaction of a diisocyanate with an hydroxyalkyl (meth)acrylate and a hydroxyl group containing polyester or from the reaction of glycidyl(meth)acrylate with a polyester containing carboxyl groups. This polyester is different than the (meth)acryloyl group containing polyesters of composition (A).
- (meth)acryloyl group containing acrylic copolymers obtained from the reaction of an epoxy-functional monomer, for example glycidyl(meth)acrylate, an acid-functional monomer, for example (meth)acrylic acid, an hydroxyl-functional monomer, for example hydroxyethyl(meth)acrylate, or an isocyanate-functional monomer, for example TMI (benzene, 1-(1-isocyanato-1-methylethyl)-4-(1-methylethenyl)) or MOI (2-isocyanatoethylmethacrylate) with respectively a carboxylic acid group, a glycidyl group, an isocyanate group or a hydroxyl group containing acrylic copolymer. This (meth)acryloyl group containing acrylic copolymer is different than the acrylic copolymer of composition (A).
- (meth)acryloyl group containing (hydrogenated) polyphenoxy resins prepared from the reaction of the glycidyl group of a (hydrogenated) polyphenoxy resin with:
  (meth)acrylic acid
  the reaction product of an hydroxyalkylester of (meth)acrylic acid such as hydroxyethyl(meth)acrylate with an anhydride such as phthalic anhydride or succinic anhydride
- (meth)acryloyl group containing polyesteramides prepared from the reaction of glycidyl(meth)acrylate with carboxyl group terminated polyesteramides, said polyesteramides being prepared from the reaction of a carboxyl group terminated polyester with a diamine
- (meth)acryloyl group containing polyurethanes prepared from the reaction of an hydroxyalkyl(meth)acrylate and a polyol with a polyisocyanate
- (meth)acryloyl group containing oligomers The powder coating composition (B) accordingly the present invention preferably comprises a (meth)acryloyl group containing polyester optionally in combination with a (meth)acryloyl group containing (hydrogenated) polyphenoxy resin.

The powder coating composition accordingly the present invention preferably comprises from 20 to 100% weight of powder composition(s) (A) and from 0 to 80% weight of powder composition(s) (B), more preferably from 50 to 100% weight of powder composition (A) and from 0 to 50% weight of powder composition (B).

The powder compositions accordingly the present invention, are intended for being cured by UV radiation or by accelerated electron beams, it being possible for the said compositions to be used in particular as varnishes and paints, proving a 600 relative gloss value between 10 and 80%.

For the radiation curing of the powder compositions in accordance with the invention with accelerated electron beams, it is not necessary to use a photo-initiator, seeing that this type of radiation provides by itself alone a production of free radicals which is sufficiently high for the curing to be extremely rapid. In contrast, when it concerns the photo-curing of the powder composition according to the invention with radiation where the wavelengths are between 200 and 600 nm (UV radiation), the presence of at least one photo-initiator is essential.

The photo-initiators which can be used according to the present invention are chosen from those commonly used for this purpose.

The appropriate photo-initiators which can be used, are aromatic carbonyl compounds, such as benzophenone and its alkylated or halogenated derivatives, anthraquinone and its derivatives, thioxanthone and its derivatives, benzoin ethers, aromatic or non-aromatic alpha-diones, benzil dialkyl acetals, acetophenone derivatives and phosphine oxides.

Photo-initiators which may be suitable, are, for example, 2,2'-diethoxyacetophenone, 2-, 3- or 4-bromoacetophenone, 2,3-pentanedione, hydroxycyclohexylphenylketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzildimethylketal, diphenyl(2,4,6-trimethylbenzyl)phosphine oxide, and the like. It may be optionally advantageous to use a photo-activator, such as tributylamine, 2-(2-aminoethylamino) ethanol, cyclohexylamine, diphenylamine, tribenzylamine or aminoacrylates such as, for example, the addition product of a secondary amine, such as dimethylamine, diethylamine, diethanolamine, and the like, with a polyol polyacrylate, such as the diacrylate of trimethylolpropane or of 1,6-hexanediol, and the like.

The powder compositions in accordance with the invention usually contain 0 to 15 and preferably 0.5 to 8 parts of photo-initiators and optionally a photo-activator for 100 parts by weight of binder in accordance with the invention.

The radiation-curable powder compositions in accordance with the invention can also contain various additional substances conventionally used in the manufacture of powder paints and varnishes.

The additional substances optionally added to the radiation curable powder compositions in accordance with the invention are, inter alia, compounds which absorb UV radiation, such as Tinuvin 900 (Ciba), light stabilisers based on sterically hindered amines (for example Tinuvin 144 from Ciba), fluidity-regulating agents such as Resiflow PV5 (Worlee), Modaflow (Monsanto), Acronal 4F (BASF) or Crylcoat 109 (UCB), degassing agents such as benzoin and the like.

To the radiation curable powder composition according to the present invention, further can be added a variety of coating properties modifying substances such as polytetrafluoroethylene modified polyethylene waxes (e.g. Lanco Wax TF1830 from Lubrizol), polyethylene waxes (e.g. Ceraflour 961 from BYK Chemie), polypropylene waxes (e.g. Lanco Wax PP1362 from Lubrizol), polyamide waxes (e.g. Orgasol 3202 D NAT 1 from ELF Atochem), organosflicones (e.g. Modarez S304P from Protex), etc., or blends of them. These modifying substances are optionally added from 0 to 10 parts for 100 parts of the binder according to the invention.

A variety of pigments and inorganic fillers can also be added to the radiation curable powder compositions in accordance with the invention. Mention will be made, as examples of pigments and fillers, of metal oxides, such as titanium oxide, iron oxide, zinc oxide, and the like, metal hydroxides, metal powders, sulphides, sulphates, carbonates, silicates such as, for example, aluminium silicate, carbon black, talc, kaolins, barytes, iron blues, lead blues, organic reds, organic maroons, and the like.

These additional substances are used in the usual amounts, it being understood that if the radiation curable powder compositions in accordance with the invention are used as varnishes, the addition of additional substances having opacifling properties will be omitted.

For the preparation of the radiation curable powder compositions (A), the amorphous isophthalic acid rich polyester and acrylic copolymer mixture containing (meth)acryloyl groups, the ethylenically unsaturated oligomer and/or (meth)acryloyl group containing semi-crystalline polyester, if they are present, the photo-initiator, the various additional substances conventionally used for the manufacturing of powder paints and varnishes, and optionally the coating properties modifying substances are usually dry mixed, for example in a tumbling mixer. The dry-mix is then homogenised at a temperature ranging from 60 to 150° C. in an extruder, for example a Buss Ko-Kneter single-screw extruder or a twin-screw extruder of Werner-Pfleiderer, APV-Baker or Prism type. The extrudate is then allowed to cool, is ground and sieved in order to obtain a powder in which the size of the particles is between 10 and 150 μm. When a dry blend of different powders is intended, the other powder coating compositions (B) are prepared in a similar way. The different powders, thus obtained, then can be dry-mixed using a high performance mixer, similar to the equipment as for the preparation of the powder pre-mix.

Instead of the above method, it is also possible to dissolve the different unsaturated constituents of the binder system of the present invention, optionally the photo-initiator, and the various additional substances in a solvent such as dichloromethane, to grind in order to obtain a homogeneous suspension containing approximately 30% by weight of solid matter and subsequently to evaporate the solvent, for example by spray drying at a temperature of approximately 50° C., according to methods known in the art.

The powder paints and varnishes thus obtained are entirely suitable for application to the article to be coated by conventional techniques, that is to say by the well-known technique of deposition in a fluidised bed or by application with a triboelectric or electrostatic spray gun.

After having been applied to the article concerned, the coatings deposited are heated in a forced circulation oven or by means of infrared lamps at a temperature of 80 to 150° C. for a time of approximately 0.5 to 10 minutes for the purpose of obtaining the melting and the spreading of the powder particles as a smooth, uniform and continuous coating at the surface of the said article. As soon as the coating is molten in a smooth, uniform and continuous film, it is then cured by radiation, such as UV light emitted, for example, by medium-pressure mercury vapour UV radiators, of at least 80 to 250

W/linear cm, or by any other well-known source of the state of the art, at a distance of approximately 5 to 20 cm and for a time of 1 to 60 seconds. Preferably, the molten coating is cured without delay after its melting.

The molten coating can also be cured with accelerated electron beams of at least 150 keV, the power of the devices employed being a direct function of the thickness of the composition layer to be cured by polymerisation.

The radiation-curable powder compositions in accordance with the invention can be applied to the most diverse substrates, such as, for example, paper, cardboard, wood, fibre board, textiles, metals of different nature, plastics, such as polycarbonates, poly(meth)acrylates, polyolefins, polystyrenes, poly(vinylchloride)s, polyesters, polyurethanes, polyamides, copolymers such as acrylonitrile-butadiene-styrene (ABS) or cellulose acetate butyrate, and the like.

The examples which will follow illustrate the invention without limiting it. Except when otherwise indicated, the parts mentioned in the examples are parts by weight.

EXAMPLE 1

Preparation of an Amorphous Carboxyl Functionalised Isophthalic Acid Rich Polyester Step 1

420.009 parts of neopentyl glycol is reacted with 721.587 parts of isophthalic acid in the presence 2.490 parts of n-butyltin trioctoate and 0.996 parts of tributylphosphite, at a temperature of 220° C. in a reactor. The reaction is continued, first under atmospheric pressure, then under a vacuum of 50 mm Hg until following characteristics are obtained:

| | |
|---|---|
| AN = | 36 mg KOH/g |
| OHN = | 2 mg KOH/g |
| Brookfield$^{200° C.}$ = | 2000 mPa · s |

EXAMPLE 2

Preparation of a Methacryloyl Group Containing Semi-Crystalline Polyester

Step 1

205.40 parts of ethylene glycol are reacted with 827.90 parts of dodecanedioic acid in the presence of 2.30 parts of n-butyltin trioctoate at a temperature of 220° C. in a reactor as in example 1. After about 95% of the theoretical quantity of water is distilled and a transparent prepolymer is obtained, 0.90 parts of tributylphosphite are added and a vacuum of 50 mm Hg is gradually applied.

After 3 hours at 220° C. and 50 mm Hg, following characteristics are obtained:

| | |
|---|---|
| AN = | 36 mg KOH/g |
| OHN = | 2 mg KOH/g |

Step 2

The carboxyl functionalised polyester is cooled down to 150° C. and 0.09 parts of di-t-butylhydroquinone along with 0.46 parts of ethyltriphenylphosphonium bromide are added. Subsequently 7.73 parts of glycidyl methacrylate are slowly added (30 minutes) while stirring under oxygen. An hour after the addition is ended, a crystalline methacryloyl unsaturated polyester, with the following characteristics, is obtained:

| | |
|---|---|
| AN = | 1.1 mg KOH/g |
| Brookfield$^{200° C.}$ = | 220 mPa · s |
| Tm = | 80-85° C. |
| U.E.W. = | 1700 g/double bond |

EXAMPLEs 3 to 5

Preparation of Carboxyl Functional Acrylic Copolymers

A quantity of (X) parts, as indicated in Table 1, of n-butanol is placed in a conventional four-neck glass reactor equipped with a stirrer, two addition funnels and a thermocouple attached to a thermoregulator and heated to 118° C. under mild nitrogen overflow conditions. Subsequently a mixture of tert.-butyl peroxybenzoate and (Y) parts, as indicated in Table 1, of n-butanol is added to the reactor over a 215 minute period. Five minutes after the start of the initiator addition a mixture of acrylic acid, isobornylacrylate, styrene and n-dodecylmercaptan are added over a 180 minute period. The quantities of these products used are indicated in Table 1. After completion of both additions, the mixture is stirred for another 100 minute period at 118° C.

After ending the synthesis the reaction mixture is heated for stripping to 175° C. Thereto a reduced pressure of 600 mbar is applied during 30 minutes. Afterwards pressure is reduced to 50 mbar for another 90 minutes meanwhile temperature is kept at 175° C.

TABLE 1

| Composition | Ex. 3 | Ex. 4 | Ex. 5 |
|---|---|---|---|
| acrylic acid | 77.07 | 37.69 | 46.12 |
| isobornylacrylate | 223.41 | 187.32 | 254.37 |
| styrene | 187.32 | 262.79 | 187.32 |
| n-dodecylmercaptan | 9.76 | 9.76 | 9.76 |
| n-butanol (X) | 390.24 | 390.24 | 390.24 |
| tert.-butyl peroxybenzoate | 14.63 | 14.63 | 14.63 |
| n-butanol (Y) | 97.56 | 97.56 | 97.56 |
| Mn | 4015 | 4360 | 4390 |
| Mw | 9185 | 10025 | 11870 |
| Mw/Mn | 2.3 | 2.3 | 2.7 |
| Tg TMA onset (° C.) | 104 | 101 | 104 |
| Brookfield viscosity in mPa · s (Cone 5 at 200° C./200 RPM) | 9300 | 6900 | 9700 |
| Residual n-butanol in the resin (% weight) | 0.10 | 0.25 | <0.05 |
| Acid number (mg KOH/g) | 104.40 | 51.60 | 64.20 |

EXAMPLEs 6 to 9

Preparation of Blends of Methacryloyl Group Containing Amorphous Polyesters and Acrylic Copolymers, Along with Methacryloyl Group Containing Crystalline Polyesters in Example 7

To "W" parts of the carboxyl functional polyester, as indicated in column 2 of Table 3, standing at 160° C. under a nitrogen atmosphere, "Z" parts of the carboxylic acid functionalised acrylic copolymer, as indicated in column 3 of Table 3, is added. Once the mixture is homogenized, the nitrogen atmosphere is replaced by oxygen and 0.1% weight of methylethylhydroquinone, 0.05% weight of tributylphosphite and 0.25% weight of ethyltriphenylphosphonium bromide, all expressed relative to the quantities of "W"+"Z", are added. Subsequently, "V" parts of glycidyl methacrylate (GMA), as given in column 4 of Table 3, are added to the mixture in about 1 hour, while stirring with oxygen passing through and saturating the reaction medium. One hour after the addition is ended, the unsaturated resin mixture according to the present invention, proving a residual acid number of less than 5 mg KOH/g is obtained. To the resin mixtures, thus obtained, furthermore are added, for the example 7, "U" parts of the methacryloyl group containing semi-crystalline polyester of Example 2, as given in column 5 of Table 3, while stirring under oxygen at a temperature of 160° C. for about half an hour. The resin mixtures of Examples 6 to 9, thus obtained, are further used as the binder of the powder compositions.

TABLE 3

| Ex. | Carboxylated polyester ("W" parts) | Carboxylated acrylic copolymer ("Z" parts) | GMA ("V" parts) | Methacryloyl semi-crystalline polyester ("U" parts) |
|---|---|---|---|---|
| 6 | Ex. 1: 666.9 | Ex. 3: 222.4 | 110.7 | |
| 7 | Ex. 1: 533.5 | Ex. 3: 177.9 | 88.6 | Ex. 2: 200.0 |
| 8 | Ex. 1: 668.2 | Ex. 4: 229.4 | 82.4 | |
| 9 | Ex. 1: 683.2 | Ex. 5: 227.8 | 89.0 | |

The unsaturated equivalent weight, in g/double bond, of the methacryloyl group containing resins derived from the products of examples 1 and 3 to 5 and obtained according to examples 6 to 9 are given in Table 2.

TABLE 2

| Example 1 | 1700 g/db |
| Example 2 | 1700 g/db |
| Example 3 | 675 g/db |
| Example 4 | 1230 g/db |
| Example 5 | 1020 g/db |

EXAMPLEs 10 to 13

Preparation of Radiation Curable Powder Coating Compositions

A series of white powders, which can be used for the manufacturing of coatings by spraying with the aid of an electrostatic spray gun, is prepared from the blends (binders) of examples 6 to 9 of the amorphous polyester(s) and acrylic copolymer(s) containing (meth)acryloyl groups, optionally in combination with the semi-crystalline polyester containing (meth)acryloyl groups, the formulation of these powders being as follows:

| binder | 750.0 parts |
| titanium dioxide[1] | 250.0 parts |
| α-hydroxyketone[2] | 12.5 parts |
| bisacylphosphine oxide[3] | 12.5 parts |
| fluidity regulating agent[4] | 10.0 parts |

[1]Kronos 2310 (Kronos)
[2]Irgacure 2959 (Ciba)
[3]Irgacure 819 (Ciba)
[4]Resiflow PV5 (Worlee Chemie)

These powder compositions are prepared by dry mixing the (meth)acryloyl group containing resin mixture, the photo-initiator and the (meth)acryloyl group containing semi-crystalline polyester, if present, with the various additional substances conventionally used for the manufacture of powder paints and varnishes. The mixtures obtained are homogenised at a temperature of approximately 70 to 140° C. in a Prism 16 mm (L/D=15/1) twin screw extruder (from the company Prism), and the extrudate is ground in a grinder of Alpine 100UPZ (from the company Alpine). To complete, the powder is sieved in order to obtain a size of the particles between 10 and 110 μm.

The powders thus formulated are applied with an electrostatic spray gun at a voltage of 60 kV on cold rolled steel panels (0.6 mm.) with a film thickness of 40 to 100 μm. The coatings deposited are then subjected to melting in a medium wavelength infrared/convection oven (Triab) at a temperature of 140° C. during a time of approximately 3 minutes, and are then subjected to irradiation with ultraviolet light emitted by a 160 W/cm Gallium-doped and/or a 160 W/cm medium-pressure mercury vapour UV-bulb (Fusion UV Systems Ltd.) with a total UV-dose of 4000 mJ/cm$^2$.

The cured coatings thus obtained are subjected to conventional tests. The results obtained are reported in Table 4 in which:

column 1: number of the example of the formulation column 2: number of the example of the binder used column 3: indicates the 60° gloss, measured according to ASTM D523 column 4: indicates the number of twofold rubbing movements (to and fro) with a cotton pad impregnated with MEK, which does not detrimentally affect the appearance of the surface of the cured film. The pressure applied is as when erasing a pencil mark with a pencil eraser.

column 5: indicates the pencil hardness according to the Wolff-Wilborn scratch harness tester.

TABLE 4

| Powder of Ex. n° | Binder blend of example n° | Gloss 60° | MEK double rub | Pencil hardness |
|---|---|---|---|---|
| 10 | 6 | 13 | >100 | H-2H |
| 11 | 7 | 17 | >100 | H-2H |
| 12 | 8 | 52.2 | >100 | H-2H |
| 13 | 9 | 25.8 | >100 | H-2H |

For all the powders, accordingly the present invention (Ex. 10 to Ex. 13), upon application and curing, coatings exhibiting an exceptional smoothness are perceived. Besides, for all the coatings, a MEK resistance of more than 100 double rubs is observed, which shows a far better chemical resistance than the coatings obtained according to prior art. The pencil hardness, situated around H/2H, is also elevated.

As appears from the table 4, the powder compositions accordingly the present invention all prove to have a 60° relative gloss value ranging from 13 to 52%.

EXAMPLE 14

Preparation of Methacryloyl Group Containing Terephthalic Acid Rich Amorphous Polyester Step 1

374.023 parts of neopentyl glycol and 10.642 parts of trimethylolpropane is reacted with 567.278 parts of terephthalic acid in the presence of 2.072 parts of n-butyltin trioctoate, as in example 1, until a hydroxyl functionalised prepolymers with following characteristics is obtained:

| | |
|---|---|
| AN = | 5 mg KOH/g |
| OHN = | 45 mg KOH/g |

Step 2

96.495 parts of isophthalic acid along with 32.294 parts of adipic acid and 0.458 parts of tributylphosphite are added. The reaction is continued as in example 1 until a carboxyl functional polyester with following characteristics is obtained:

| | |
|---|---|
| AN = | 33 mg KOH/g |
| OHN = | 1 mg KOH/g |
| Brookfield$^{200°\ C.}$ = | 6700 mPa·s |

Step 3

The carboxyl functionalised polyester is cooled down to 150° C. and 0.464 parts of di-t-butylhydroquinone along with 4.584 parts of ethyltriphenylphosphonium bromide are added. Subsequently 77.240 parts of glycidyl methacrylate are slowly added (30 minutes) while stirring under oxygen. An hour after the addition is ended, a methacryloyl unsaturated polyester with the following characteristics is obtained:

| | |
|---|---|
| AN = | 3 mg KOH/g |
| Brookfield$^{200°\ C.}$ = | 4700 mPa·s |
| U.E.W. = | 1840 g/double bond |

EXAMPLE 15

Preparation of Methacryloyl Group Containing Polyphenoxy Resin

In a conventional four-neck round bottom flask equipped with a stirrer, an inlet for oxygen, an inlet for (meth)acrylic acid and a thermocouple attached to a thermoregulator, 910 parts of Araldite GT7004 (a Bisphenol-A-polyphenoxy resin with a EEW of 715-750 and a softening point of 95-101° C.) are heated under oxygen to a tem-perature of 140° C. Subsequently 0.8 parts of ethyltriphenylphosphonium bromide are added and the addition of 90 parts of acrylic acid containing 0.2 parts of di-t-butylhydroquinone, is started. The acrylic acid addition is completed in a 3-hour period. One and an half hour after the completion of the acrylic acid addition, a resin with the following characteristics is obtained:

| | |
|---|---|
| AN = | 7 mg KOH/g |
| unsaturation = | 806 g/db |
| Brookfield$^{200°\ C.}$ = | 700 mPa·s |
| Tg = | 49° C. |
| Mn = | 1650 |

EXAMPLE 16

Preparation of a Methacryloyl Group Containing Isophthalic Acid Rich Amorphous Polyester Step 1

A mixture of 329.0 parts of neopentyl glycol along with 2.0 parts of n-butyltin triocto-ate catalyst is placed in a conventional four-neck round bottom flask as in example 1. The flask contents are heated while stirring, under nitrogen to a temperature of circa 140° C. Thereupon 571.3 parts of isophthalic acid are added while stirring and the mixture is gradually heated to a temperature of 225° C. Distillation starts from about 190° C. After a two-hour period at 225° C. and when the reaction mixture is trans-parent, 0.7 parts of tributylphosphite are added and a vacuum of 50 mm Hg is gradually applied. After 3 hours at 225° C. and 50 m Hg, following characteristics are obtained:

| | |
|---|---|
| AN = | 46 mg KOH/g |
| OHN = | 4 mg KOH/g |
| Brookfield$^{175°\ C.}$ = | 5700 mPa·s |

Step 2

The carboxyl functionalised polyester is cooled down to 150° C. and 1.1 parts of di-t-butylhydroquinone along with 3.9 parts of ethyltriphenylphosphonium bromide are added. Subsequently 92.3 parts of glycidyl methacrylate is slowly added (30 minutes) while stirring under oxygen. An hour after the addition is ended, a methacryloyl unsaturated polyester with the following characteristics is obtained:

| | |
|---|---|
| AN = | 3 mg KOH/g |
| OHN = | 39 mg KOH/g |
| unsaturation = | 1540 g/db |
| Brookfield$^{175°\ C.}$ = | 1800 mPa·s |
| Tg = | 42° C. |
| Mn = | 3100 |

EXAMPLEs 17-19

Dry-Blend of Two Powders (A) and (B)

The powder comprising the binder of example 6 subsequently was dry-blended with a white powder based on the terephthalic acid rich of example 14 in a 50/50 weight ratio. Similarly the powder comprising the binder of example 6 was dry-blended in a 50/50 weight ratio with a white powder based on a 50/50 mixture of a methacryloyl group containing terephthalic acid rich polyester (example 14) and a methacryloyl group containing polyphenoxy resin (example 15). In the last example, 50 parts of the binder of example 6 are mixed with 25 parts of the polyester of example 16 and 25 parts of the polyphenoxy resin of example 15.

The paint performances of the coatings obtained after melting and curing of the dry blends are reproduced in table 5.

TABLE 5

| | | Gloss 60° | MEK-rubs | Hardness |
|---|---|---|---|---|
| Example 17 | Ex. 6 + Ex. 14 | 28 | >100 | H-2H |
| Example 18 | Ex. 6 + Ex. 14/Ex. 15 | 52 | >100 | H-2H |
| Example 19 | Ex. 6 + Ex. 16 + Ex. 15 | 56 | >100 | H-2H |

The invention claimed is:

1. A radiation curable powder coating composition, comprising as a binder a mixture of 30 to 90 weight % of one or more (meth)acryloyl group containing amorphous polyester resins having an unsaturated equivalent weight of more than 700 g/double bond and an isophthalic acid content of from 65 to 100 weight %, calculated on all the acids, and 10 to 70 weight % of one or more (meth)acryloyl group containing acrylic copolymers having an unsaturated equivalent weight of up to 1250 g/double bond, based on the total weight of the binder,
wherein the (meth)acryloyl group containing amorphous polyester resins are obtained from the corresponding carboxyl group containing polyester, which is the reaction product of an acid constituent which contains from 65 to 100 mole percentage of isophthalic acid and of a glycol constituent which contains from 20 to 100 mole percentage of neopentyl glycol,
wherein the (meth)acryloyl group containing acrylic copolymers are obtained from the corresponding carboxyl group containing acrylic copolymers, and
wherein the carboxylic group containing polyester is in admixture with the carboxylic group containing acrylic copolymer, and the admixture is further reacted with a monomer having a (meth)acryloyl group and an epoxy functional group.

2. The radiation curable powder composition according to claim 1, wherein the carboxyl group containing polyesters have:
a number averaged molecular weight ranging from 1200 to 15000, measured by gel permeation chromatography (GPC),
an acid number of from 10 to 90 mg KOH/g,
a melt viscosity of from 10 to 50000 mPa·s, measured with a cone/plate viscometer at 200° C. (Brookfield viscosity) according to ASTM D4287-88, and
a glass transition temperature ranging from 35 to 85° C., determined by differential scanning calorimetry (DSC) according to ASTM D3418-82.

3. The radiation curable powder coating composition according to claim 1, wherein the carboxyl group containing acrylic copolymer is composed of from 10 to 95 mole percentage of an ethylenically unsaturated monomer having carboxylic acid functional groups selected from the group consisting of acrylic acid, methacrylic acid, crotonic acid, itaconic acid, fumaric acid, maleic acid, citraconic acid, and the monoalkylesters of unsaturated dicarboxylic acids, and of from 5 to 90 mole percentage of another ethylenically unsaturated monomer.

4. The radiation curable powder composition according to claim 1, further comprising from 0 to 60 parts by weight of an ethylenically unsaturated oligomer and/or one or more (meth)acryloyl group containing semi-crystalline polyester per 100 parts by weight of the binder.

5. The radiation curable powder composition according to claim 4, wherein the (meth)acryloyl group containing semi-crystalline polyester is the reaction product of:
an acid constituent which contains 75 to 100 mole percentage of terephthalic acid, 1,4-cyclohexanedicarboxylic acid or a saturated straight-chain aliphatic dicarboxylic acid having 4 to 14 carbon atoms and from 0 to 25 mole percentage of at least one other saturated or unsaturated aliphatic, cycloaliphatic or aromatic di- or polycarboxylic acid, with
a glycol constituent which contains 75 to 100 mole percentage of 1,4-cyclohexanedimethanol, 1,4-cyclohexanediol or a saturated straight-chain aliphatic diol having 2 to 12 carbon atoms, and from 0 to 25 mole percentage of at least one other aliphatic or cycloaliphatic di- or polyol, this semi-crystalline polyester being thereafter reacted with
glycidyl (meth)acrylate or methyl glycidyl (meth)acrylate, when a carboxyl functional semi-crystalline polyester is concerned, or
hydroxyalkyl(meth)acrylate and a di-isocyanate when a hydroxyl functional semi-crystalline polyester is concerned.

6. The radiation curable powder composition according to claim 4, wherein the (meth)acryloyl group containing semi-crystalline polyester has:
an unsaturated equivalent weight of at least 700 g/double bond,
a number average molecular weight between 1000 and 21000, measured by gel permeation chromatography (GPC),
a well-defined melting point of approximately 60 to 150° C., determined by differential scanning calorimetry (DSC) according to ASTM D3418-82, and
a melt viscosity of less than 10000 mPa·s, measured at 175° C. with a cone/plate viscometer (Brookfield viscosity) according to ASTM D4287-88.

7. The radiation curable powder composition according to claim 1, wherein the binder is dry blended with 0 to 80 weight % of another powder coating composition (B) comprising one or more unsaturated resins selected from the group consisting of:
(meth)acryloyl group containing polyesters obtainable from the reaction of a di-isocyanate with an hydroxyalkyl(meth)acrylate and a hydroxyl group containing polyester or from the reaction of glycidyl(meth)acrylate with a polyester containing carboxyl groups,
(meth)acryloyl group containing acrylic copolymers obtained from the reaction of an epoxy-functional monomer, an acid-functional monomer, an hydroxyl-functional monomer, or an isocyanate-functional monomer, with respectively a carboxylic acid group, a glycidyl group, an isocyanate group or a hydroxyl group containing acrylic copolymer,
(meth)acryloyl group containing (hydrogenated) polyphenoxy resins prepared from the reaction of the glycidyl group of a (hydrogenated) polyphenoxy resin with:
(meth)acrylic acid
the reaction product of an hydroxyalkylester of (meth)acrylic acid with an anhydride,
(meth)acryloyl group containing polyesteramides prepared from the reaction of glycidyl(meth)acrylate with a carboxyl group terminated polyesteramides, said polyesteramides being prepared from the reaction of a carboxyl group terminated polyester with a diamine, (meth)acryloyl group containing polyurethanes prepared from the reaction of an hydroxyalkyl(meth)acrylate and a polyol with a polyisocyanate, and (meth)acryloyl group containing oligomers.

8. The radiation curable powder composition according to claim 1, curable by UV irradiation, which additionally comprises up to 15 parts by weight of a photo-initiator and optionally a photo-activator for 100 parts by weight of the binder.

9. The radiation curable powder composition according to claim 1, curable by irradiation with an accelerated electron beam.

10. The radiation curable powder composition according to claim 1, which additionally comprises, for 100 parts by weight of the binder, from 0 to 10 parts by weight of a coating properties modifying substance.

11. A paint or varnish obtained from the powder composition according to claim 1.

12. An article coated entirely or partially with the varnish and/or paint according to claim 11.

13. The radiation curable powder composition according to claim 2, wherein the number averaged molecular weight of the carboxyl group containing polyesters ranges from 1500 to 8500, and the acid number of the carboxyl group containing polyesters is from 20 to 70 mg KOH/g.

14. A radiation curable powder coating composition, comprising as a binder a mixture of 30 to 90 weight % of one or more (meth)acryloyl group containing amorphous polyester resins having an unsaturated equivalent weight of more than 700 g/double bond and an isophthalic acid content of from 65 to 100 weight %, calculated on all the acids, and 10 to 70 weight % of one or more (meth)acryloyl group containing acrylic copolymers having an unsaturated equivalent weight of up to 1250 g/double bond, based on the total weight of the binder, wherein the (meth)acryloyl group containing amorphous polyester resins are obtained from the corresponding carboxyl group containing polyester, which is the reaction product of an acid constituent which contains from 65 to 100 mole percentage of isophthalic acid and of a glycol constituent which contains from 20 to 100 mole percentage of neopentyl glycol, wherein the (meth)acryloyl group containing acrylic copolymers are obtained from the corresponding carboxyl group containing acrylic copolymers, and wherein the carboxylic group containing polyester is in admixture with the carboxylic group containing acrylic copolymer, and the admixture is further reacted with a monomer having a (meth)acryloyl group and an epoxy functional group, wherein the carboxyl group containing acrylic copolymers have:

a number averaged molecular weight ranging from 1000-60000, measured by gel permeation chromatography (GPC), a melt viscosity of from 10 to 50000 mPa·s, measured with a cone/plate viscometer at 200° C. (Brookfield viscosity) according to ASTM D4287-88, and a glass transition temperature ranging from 45 to 120° C., determined by differential scanning calorimetry (DSC) according to ASTM D3418-82.

15. The radiation curable powder composition according to claim 14, wherein the carboxyl group containing acrylic copolymers have an acid number of from 75 to 300 mg KOH/g.

16. The radiation curable powder composition according to claim 14, wherein the number averaged molecular weight of the carboxyl group containing acrylic copolymers ranges from 2000 to 15000, and the carboxyl group containing acrylic copolymers have an acid number of from 75 to 200 mg KOH/g.

* * * * *